Patented Feb. 9, 1943

2,310,729

UNITED STATES PATENT OFFICE 2,310,729

PROCESS OF PRODUCING CELLULOSE DERIVATIVES

Rudolph S. Bley, Milligan College, Tenn., assignor to North American Rayon Corporation, New York, N. Y., a corporation of Delaware No Drawing. Application January 5, 1942, Serial No. 425,629

13 Claims. (Cl. 260—214)

The present invention relates to a process of producing mixed cellulose esters and cellulose ester-ethers.

It is an object of the present invention to provide a process whereby partially etherified and/or esterified cellulose may be treated with an alkali metal or an alkali metal amide dissolved and/or dispersed in anhydrous, liquid ammonia in the presence or absence of an inert inorganic liquid (swelling agent) to form an alkali metal cellulosate which then may be esterified to form mixed cellulose derivatives.

Other objects of the present invention will become apparent to those skilled in the art from a study of the following specification.

I am well aware that it has, heretofore been proposed to prepare alkali metal cellulosates by reacting alkali metals or alkali metal amides with cellulose in the presence of anhydrous, liquid ammonia and to convert the cellulosates thus formed into cellulose esters and ethers. However, I have unexpectedly found that cellulose ester-ethers and mixed cellulose esters may be obtained by reacting a partially esterified and/or etherified cellulose with an alkali metal or its amide in anhydrous, liquid ammonia to form an alkali metal cellulosate of the partially substituted cellulose which may be reacted with an esterifying agent to form a mixed (polyhetero substituted) cellulose derivative. The cellulosate is preferably formed in liquid ammonia containing a dissolved and/or dispersed aromatic hydrocarbon, preferably an alkyl substituted, aromatic hydrocarbon. Although any alkali metal or alkali metal amide may be used in this process, I prefer to employ metallic sodium or potassium and their respective amides for reasons of economy. In carrying out the process in accordance with the present invention I introduce a substantially anhydrous, partially substituted cellulose into anhydrous, liquid ammonia preferably below its boiling point of about —33° C. at atmospheric pressure and add thereto a suitable amount of an alkali metal or alkali metal amide. The completion of the reaction is indicated by the disappearance of the characteristic color of the alkali metal or amide employed. This may require a few hours or even several days, depending upon the temperature of the ammonia, the nature of the cellulose derivative treated, the amount of alkali metal or amide introduced, the organic liquid used, etc. The reaction may be carried out at temperatures ranging from about —80° C. up to about 30° C. By varying the amount of alkali metal or alkali metal amide, it is possible to prepare mono-, di or tri-substituted alkali metal cellulosates since cellulose has three reactive hydroxyl groups per anhydro-glucose unit ($C_6H_{10}O_5$). Thus 1 to 3 equivalents of an alkali metal may be reacted with 1 anhydro-glucose unit of cellulose to form alkali metal cellulosates. As starting materials I may use any mono- or di-substituted cellulose derivative provided it is sufficiently stable in the ammonia at the temperature of reaction, for example cellulose monoacetate, cellulose diacetate, mono-ethyl-cellulose, diethyl-cellulose, cellulose monopropionate, cellulose dipropionate, monopropyl cellulose, dipropyl cellulose, mono-methyl cellulose, dimethyl cellulose, etc. In other words, I may use any cellulose derivative having one or two ester or ether groups. These ester or ether groups may be derived from identical or different hydrocarbons. Thus, I may use as starting material mono-methyl cellulose monoacetate, mono-ethyl cellulose monoacetate, mono-ethyl cellulose, diethyl cellulose, methyl-ethyl cellulose, methyl-propyl cellulose, ethyl-propyl cellulose, etc. Thus the basic materials from which cellulosates are produced have the general structures:

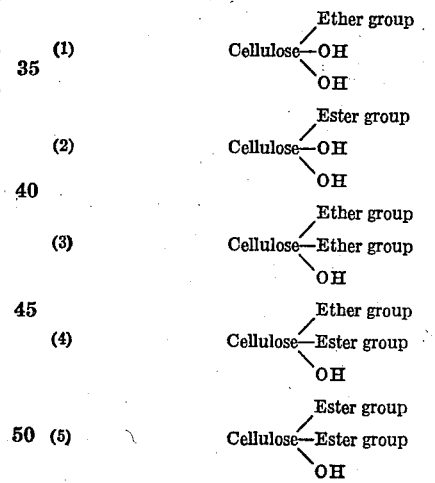

When these basic materials are reacted with equivalent amounts of alkali metals or alkali metal amides it is possible to form mono- and di-cellulosates according to the following equations:

(1) Cellulose derivative—OH + Alkali metal or alkali metal amide =
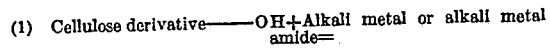
Cellulose derivative—O.Alkali metal + hydrogen (2) Cellulose derivative<OH,OH> + Alkali metal or alkali metal amide =
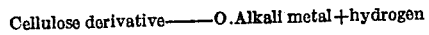
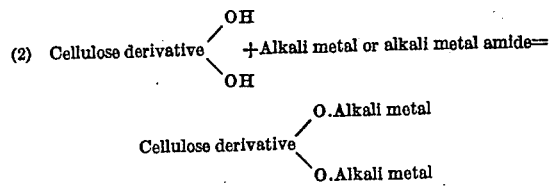
Cellulose derivative<O.Alkali metal, O.Alkali metal>

Although the preparation of the cellulosates may be carried out in anhydrous, liquid ammonia per se, I have found that the reaction is favored by the presence of an inert, organic liquid in the ammonia. These liquids must be inert, i. e., they must be substantially resistant to chemical attack by the ammonia, the alkali metals and alkali metal amides and sufficiently soluble in the ammonia at the reaction temperature. Alkyl substituted aromatic hydrocarbons, for example toluene, are especially useful for this purpose although they are practically insoluble in anhydrous, liquid ammonia. Benzene is also a suitable inert liquid at temperatures above $-33°$ C. These inert, organic liquids probably swell the cellulosates to some extent and promote the reaction of the etherifying agents therewith. They may be added to the ammonia in amounts ranging from about 10 to 50% by volume.

When the alkali metal cellulosates are reacted with etherifying agents cellulose esters are formed together with alkali metal salts. Since the esterifying agents interact chemically with ammonia it is necessary, for reasons of economy, to remove most of the ammonia by evaporation before adding the esterifying agent to the reaction mixture. The removal of excess ammonia must be carried out in a dry atmosphere to prevent decomposition of the alkali metal cellulosate. After allowing the anhydrous, liquid ammonia to boil slowly from the reaction mixture until the cellulosate is still in a moistened condition the esterifying agent is added thereto. It is preferable to add the anhydrous esterifying agent dissolved in an anhydrous organic solvent such as for example pyridine, benzene or toluene. In other words, I may use any anhydrous organic solvent conventionally used in esterification processes. Esterification may be accelerated and rendered more complete by using esterification catalysts in conjunction with the esterifying agents. Sulphuric acid, perchloric acid, phosphoric acid, hydrochloric acid, chloracetic acid, zinc chloride, acid sulphates, etc. are examples of suitable catalysts. It is also possible to transfer the alkali metal cellulosate from the Dewar flask into a separate vessel in order to carry out the esterification process at elevated temperatures under reflux. Although one equivalent of an esterifying agent is theoretically sufficient to react with a mono-cellulosate I prefer to use the esterifying agent in excess of the theoretical amount to assure completion of the reaction. This excess is not critical, although it is advisable to reduce it to a minimum for reasons of economy. Suitable esterifying agents are inorganic and organic acids. The organic acids include lower and higher saturated and unsaturated aliphatic acids including substituted acids, alicyclic carboxylic acids, cyclic substituted fatty acids, aromatic acids, sulphonic acids. The acyl halides as well as the anhydrides of these acids may be used as esterifying agents. Specific examples of esterifying agents are the acid halides and anhydrides of acetic acid, formic acid, propionic acid, butyric acid, lauric acid, palmitic acid, benzoic acid, oxalic acid, furoic acid, stearic acid, hydroxy stearic acid, crotonic acid, pyruvic acid, levulinic acid, phenyl acetic acid, inorganic acids such as nitric acid, phosphoric acid, sulphamic acid, sulphuric acid, etc., sulphonic acids such as for example p-toluene sulphonic acid and its acid halides. In other words I may make use of any esterifying agent known in the art.

The following example will serve to illustrate the process in accordance with the present invention.

*Example 1*

About 10 parts by weight of substantially anhydrous cellulose was introduced into a Dewar flask containing about 150 parts of anhydrous liquid ammonia of about $-33°$ C. and about 25 parts of anhydrous toluene. Two atoms of metallic sodium were added for each anhydroglucose unit of the cellulose to the ammonia-toluene mixture. After several hours the blue color of the sodium had disappeared, indicating a completion of the reaction. During this time most of the ammonia had evaporated from the flask. The mixture was placed in a pressure vessel and brought to a temperature of below $-33°$ C. Ethyl bromide was then added in a great excess over the theoretical amount required to etherify the cellulosate. The vessel was kept below $-33°$ C. for about 12 hours, then after this period the mixture was allowed to gradually reach room temperature. The diethyl cellulose was recovered from the crude reaction mixture and suspended again in anhydrous liquid ammonia containing toluene as set forth above. One atom of metallic sodium was added to the ammonia-toluene to form sodium diethyl cellulosate. After allowing most of the ammonia to boil off this cellulosate was then treated with acetyl chloride in anhydrous benzene to form diethyl cellulose acetate.

*Example 2*

Cellulose diacetate, prepared in conventional manner, was carefully dried and then introduced into anhydrous, liquid ammonia contained in a Dewar flask at a temperature of about $-33°$ C. Sodium metal was added in small quantities until the blue color of the solution disappeared. The sodium salt of cellulose diacetate produced was freed from excess ammonia by allowing the ammonia to boil off under anhydrous conditions. A solution of propionyl bromide in anhydrous pyridine was then added to the reaction mixture still moistened by residual ammonia. The contents of the Dewar flask were then transferred into a glass vessel provided with a reflux condenser and refluxed at the boiling point of the pyridine until esterification was complete. The diacetyl-propionyl cellulose was washed in water and dried. The formation of the alkali metal derivative of the cellulose acetate is facilitated by the addition of the aforementioned inert solvents to the ammonia. The reaction can be carried out at temperatures below and above the boiling point of ammonia at atmospheric pressure (about $-33°$ C.).

This is a continuation in part of my application Serial No. 351,443, filed August 4, 1940, entitled "Process of producing cellulose derivatives" and now Patent No. 2,268,564.

Modifications of my invention will be apparent to those skilled in the art, and I desire to include all modifications and variations coming within the scope of the appended claims.

I claim:

1. The process which comprises reacting a partially substituted, anhydrous cellulose ester with a substance selected from the group consisting of alkali metals and alkali metal amides in a medium comprising anhydrous, liquid ammonia and a liquid anhydrous hydrocarbon, said hydrocarbon being substantially inert to said cellulose ester, said ammonia and said substance.

2. The process which comprises reacting a partially substituted, anhydrous cellulose ester with a substance selected from the group consisting of alkali metals and alkali metal amides in a medium comprising anhydrous liquid ammonia at a temperature below −33° C. and a liquid anhydrous hydrocarbon, said hydrocarbon being substantially inert to said cellulose ester, said ammonia and said substance.

3. The process which comprises reacting a partially substituted, anhydrous cellulose ester with a substance selected from the group consisting of alkali metals and alkali metal amides in a medium comprising anhydrous liquid ammonia at a temperature below −33° C. and a liquid anhydrous alkyl substituted aromatic hydrocarbon, said hydrocarbon being substantially inert to said cellulose ester, said ammonia and said substance.

4. The process which comprises reacting a partially substituted, anhydrous cellulose ester with a substance selected from the group consisting of alkali metals and alkali metal amides in a medium comprising anhydrous, liquid ammonia and a liquid anhydrous alkyl substituted aromatic hydrocarbon, said hydrocarbon being substantially inert to said cellulose ester, said ammonia and said substance.

5. The process which comprises reacting a partially substituted, anhydrous cellulose ester with an alkali metal in a medium comprising anhydrous, liquid ammonia and a liquid anhydrous hydrocarbon, said hydrocarbon being substantially inert to said cellulose ester, said ammonia and said alkali metal.

6. The process which comprises reacting at a temperature of about −33° C. a partially substituted, anhydrous cellulose ester with an alkali metal amide in a medium comprising anhydrous, liquid ammonia and a liquid anhydrous hydrocarbon, said hydrocarbon being substantially inert to said cellulose ester, said ammonia and said alkali metal amide.

7. The process which comprises reacting a partially substituted cellulose ester with a substance selected from the group consisting of alkali metals and alkali metal amides in a medium comprising anhydrous, liquid ammonia, the amount of said substance employed being stoichiometrically equivalent to at least one unsubstituted hydroxyl group present in the partially substituted cellulose, until said substance has substantially completely reacted therewith, substantially removing excess ammonia from the reaction mixture, adding an esterifying agent in an amount at least equal to one equivalent thereof per atom of said substance, and allowing the reaction to proceed until the substance employed is substantially completely converted to the salt of the acid radical present in the esterifying agent and said substance.

8. The process which comprises reacting a partially substituted cellulose ester with a substance selected from the group consisting of alkali metals and alkali metal amides in a medium comprising anhydrous, liquid ammonia at a temperature below −33° C., the amount of said substance employed being stoichiometrically equivalent to at least one unsubstituted hydroxyl group present in the partially substituted cellulose, until said substance has substantially completely reacted therewith, substantially recovering excess ammonia from the reaction mixture, adding an esterifying agent in an amount at least equal to one equivalent thereof per atom of said substance, and allowing the reaction to proceed until the substance employed is substantially completely converted to the salt of the acid radical present in the esterifying agent and said substance.

9. The process which comprises reacting a partially etherified cellulose with an alkali metal in a medium comprising anhydrous liquid ammonia, the amount of alkali metal employed being stoichiometrically equivalent to the unsubstituted hydroxyl groups present in the partially etherified cellulose, until the alkali metal has substantially completely reacted therewith, substantially removing excess ammonia from the reaction mixture, adding an esterifying agent in amount equal to at least one equivalent thereof per atom of alkali metal, and allowing the reaction to proceed until the alkali metal employed is substantially completely converted to the alkali metal salt of the acid radical present in the esterifying agent.

10. The process which comprises reacting a partially substituted cellulose with a substance selected from the group consisting of alkali metals and alkali metal amides in a medium comprising anhydrous, liquid ammonia, the amount of said substance employed being stoichiometrically equivalent to at least one unsubstituted hydroxyl group present in the partially substituted cellulose, until said substance has substantially completely reacted therewith, substantially removing excess ammonia from the reaction mixture, adding an esterifying agent in an amount at least equal to one equivalent thereof per atom of said substance, and allowing the reaction to proceed until the substance employed is substantially completely converted to the salt of the inorganic acid radical present in the esterifying agent and said substance.

11. The process which comprises reacting a partially substituted cellulose ether with a substance selected from the group consisting of alkali metals and alkali metal amides in a medium comprising anhydrous, liquid ammonia, the amount of said substance employed being stoichiometrically equivalent to at least one unsubstituted hydroxyl group present in the partially substituted cellulose ether, until said substance has substantially completely reacted therewith, substantially removing excess ammonia from the reaction mixture, adding an esterifying agent in an amount at least equal to one equivalent thereof per atom of said substance, and allowing the reaction to proceed until the substance employed is substantially completely converted to the salt of the inorganic acid radical present in the esterifying agent and said substance.

12. The process which comprises reacting a partially substituted cellulose with a substance selected from the group consisting of alkali metals and alkali metal amides in a medium comprising anhydrous, liquid ammonia at a temperature of about −33° C., the amount of said substance employed being stoichiometrically equivalent to at least one unsubstituted hydroxyl group present in the partially substituted cellulose, until said substance has substantially completely reacted therewith, substantially removing excess ammonia from the reaction mixture, adding an esterifying agent in an amount at least equal to one equivalent thereof per atom of said substance, and allowing the reaction to proceed until the substance employed is substantially completely converted to the salt of the inorganic acid radical present in the esterifying agent and said substance.

13. The process which comprises reacting a partially substituted cellulose with a substance selected from the group consisting of alkali metals and alkali metal amides in a medium comprising anhydrous, liquid ammonia at a temperature below −33° C., the amount of said substance employed being stoichiometrically equivalent to at least one unsubstituted hydroxyl group present in the partially substituted cellulose, until said substance has substantially completely reacted therewith, substantially removing excess ammonia from the reaction mixture, adding an esterifying agent in an amount at least equal to one equivalent thereof per atom of said substance, and allowing the reaction to proceed until the substance employed is substantially completely converted to the salt of the inorganic acid radical present in the esterifying agent and said substance.

RUDOLPH S. BLEY.